T. JONES.
Hemp-Brakes.
No. 157,096.  Patented Nov. 24, 1874.
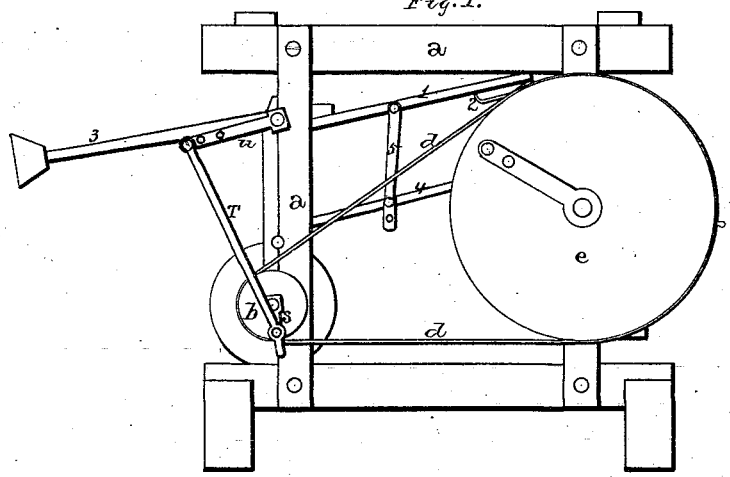
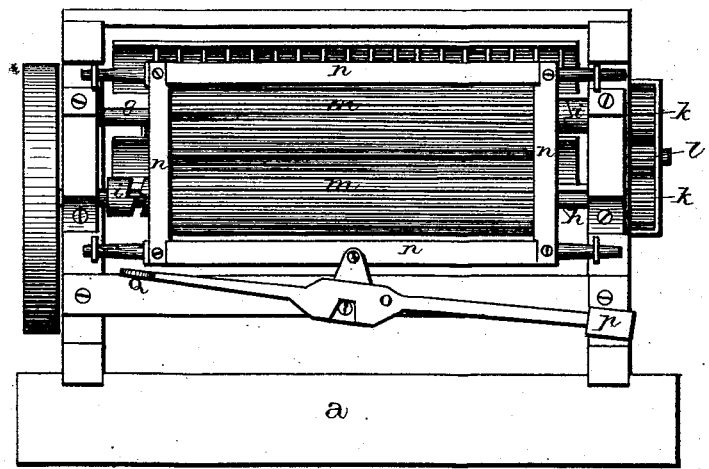
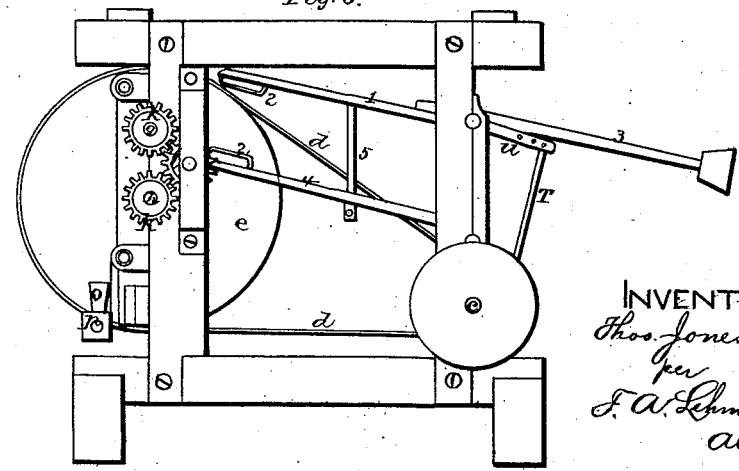
WITNESSES.  INVENTOR.

UNITED STATES PATENT OFFICE.

THOMAS JONES, OF LEXINGTON, KENTUCKY.

IMPROVEMENT IN HEMP-BRAKES.

Specification forming part of Letters Patent No. 157,096, dated November 24, 1874; application filed November 21, 1873.

*To all whom it may concern:*

Be it known that I, THOS. JONES, of Lexington, Fayette county, Kentucky, have invented certain Improvements in Hemp-Brakes, of which the following is a specification:

My invention relates to an improvement in hemp-brakes; and it consists in the combination of two fluted or grooved rollers provided with clutches, so that their motion can be reversed at will, with two beaters provided with suitable devices for separating the fibers of the hemp, as will be more fully described hereafter.

The accompanying drawings represent my invention.

$a$ represents a suitable rectangular frame, of any desired construction, in one side of which is journaled a driving-shaft, $c$. Upon one end of this shaft is placed a small driving-pulley, $b$, from which passes a belt, $d$, which communicates motion to the large wheel $e$. Journaled in the front side of the frame are two shafts, $g\ h$, upon the lower one of which is secured the large wheel E. Each of these shafts, at opposite ends, is provided with a suitable clutch, $i$, and they are geared together by means of the gear-wheels $k$ and idle-wheel $l$, so that they both revolve in the same direction. Upon these two shafts are loosely placed two fluted or grooved rollers, $m$, each of which is provided with a clutch, to correspond with the clutches on the shafts. Around these rollers is placed a rectangular frame, $n$, by means of which they are shifted back and forth upon the shafts, so that they can be thrown in gear with either clutch at the will of the operator. Pivoted to the frame $a$ on the front side, just below the shifting-frame $n$, is the weighted lever $o$, which is attached to the shifting-frame in any suitable manner. This lever has a weight, $p$, secured to it at one end, so as to hold the rollers in gear with one of the clutches, while at the other end of the lever is formed the treadle $q$, upon which the operator can place his foot, and throw the rollers in gear with the opposite clutch, and thus reverse their motion at pleasure. Secured to the small driving-pulley $b$ is a crank and wrist-pin, $s$, to which is fastened the connecting-rod T, the upper end of which rod is connected to the crank $u$. This crank is much longer than the crank upon the driving-pulley, so that the revolution of the pulley merely causes the crank to vibrate up and down. Upon the shaft to which the crank is secured is placed a beater, 1, upon the under side of which, at its inner edge, are secured a number of curved wires, 2, and to the rear edge of the beater is secured a weighted lever, 3. Some distance below the upper beater is placed a second beater, 4, which is also provided with the bent wires, and which is connected with the upper one by means of a connecting-rod, 5, so that when one beater is moved the other will move also.

The hemp is passed in between the rollers, so as to break the woody fibers, and is caught between the ends of the beaters.

By reversing the motion of the rollers, as above described, the hemp can be passed back and forth through the rollers any desired number of times.

The bent wires on the beaters serve to separate the fibers of the hemp, so that the woody portions can be readily shaken out.

The operator, standing in front of the machine, passes the hemp or flax in between the two rollers $m$, and by causing the rollers to revolve first in one direction and then the other, the hemp or flax is passed back and forth between them until all the fibers are thoroughly broken, the curved wires 2 serving to open the fibers, so that all the woody parts will drop out.

Having thus described my invention, I claim—

1. In combination with the rollers $m\ m$ and shafts $g\ h$, with their clutches $i\ i$, the weighted levers $o\ p\ q$, whereby the motion of the rollers can be reversed at will, substantially as set forth.

2. The combination of the rollers $m\ m$ with the beaters 1 4, provided with the bent wires 2, substantially as shown and described.

THOMAS JONES.

Witnesses:
WM. B. KENNEDY,
THOMAS B. BAIRD,
JOHN KENT.